United States Patent [19]

Sotoyama et al.

[11] Patent Number: 4,662,247

[45] Date of Patent: May 5, 1987

[54] CONTROL MEANS FOR VEHICLE AUTOMATIC TRANSMISSIONS

[75] Inventors: Kaoru Sotoyama; Kazutoshi Nobumoto, both of Hiroshima, Japan

[73] Assignee: Mazda Motor Corporation, Hiroshima, Japan

[21] Appl. No.: 615,827

[22] Filed: May 31, 1984

[30] Foreign Application Priority Data

Jun. 1, 1983 [JP] Japan .................................. 58-97666
Jun. 1, 1983 [JP] Japan .................................. 58-97667

[51] Int. Cl.$^4$ ............................................. B60K 41/04
[52] U.S. Cl. ................................... 74/866; 74/752 A
[58] Field of Search ................ 74/843, 866, 867, 869, 74/752 A, 752 C, 752 D; 364/424.1

[56] References Cited

U.S. PATENT DOCUMENTS

| | | | |
|---|---|---|---|
| 3,727,488 | 4/1973 | Wakamatsu et al. | 74/866 |
| 4,027,554 | 6/1977 | Ito et al. | 74/866 |
| 4,208,929 | 6/1980 | Heino et al. | 74/866 X |
| 4,346,627 | 8/1982 | Kawamoto et al. | 74/866 X |
| 4,456,107 | 6/1984 | Ito et al. | 74/866 X |

FOREIGN PATENT DOCUMENTS

| | | | |
|---|---|---|---|
| 2030661 | 4/1980 | United Kingdom | 74/866 |
| 2051979 | 1/1981 | United Kingdom | 74/866 |

*Primary Examiner*—Leslie Braun
*Assistant Examiner*—David Novais
*Attorney, Agent, or Firm*—Fleit, Jacobson, Cohn & Price

[57] ABSTRACT

A vehicle automatic transmission including a torque converter and a multiple stage transmission gear mechanism. The gear mechanism is controlled through a hydraulic system having solenoid valves. An electronic control unit is provided to control the hydraulic system under a shift control map having shift up and shift down control lines. The shift down control line is determined in terms of the torque converter turbine speed and the engine throttle valve position as a line passing through points of maximum curvature on iso-engine-output-power lines as functions of the torque converter turbine speed and the engine load.

7 Claims, 12 Drawing Figures

CONTROL MEANS FOR VEHICLE AUTOMATIC TRANSMISSIONS

BACKGROUND OF THE INVENTION

1. Field of the Invention

The present invention relates to control means for automatic transmissions and more particularly to control means for automatic transmissions adapted to be used in motor vehicles such as automobiles.

2. Description of Prior Art

Conventional automatic transmissions generally include a hydraulic torque converter having an output shaft connected with a multiple-stage gear transmission mechanism such as a planetary gear mechanism. For selecting a desired one of the gear stages, the transmission usually includes a hydraulic system which has hydraulically operated or electromagnetically operated valves for appropriately selecting hydraulic circuits to thereby engage selected ones of friction devices such as clutches and brakes. Where the hydraulic system includes electromagnetically operated solenoid valves, electronic means are generally provided for detecting that the vehicle operating condition has been shifted from one zone to another across a shifting line and for producing electric signals for energizing an appropriate one or ones of the solenoid valves.

Conventionally, such a shifting line is determined in terms of the vehicle speed and the engine load and sometimes has one or more stepped portions. Since the vehicle speed is dependent on both the engine speed and the selected gear stage, it has been required in such a conventional arrangement to provide shifting lines of different patterns for respective pairs of adjacent gear stages. Further, since the engine load is usually detected stepwisely in terms of the engine throttle valve position, there has been a possibility that the shifting lines do not match the engine operating characteristics, particularly in such areas where the shifting lines are of stepped configuration.

In order to eliminate the above problems, Japanese patent publication No. 56-44312 corresponding to U.S. Pat. No. 4,027,554 proposes to determine the shifting line in terms of the torque converter turbine speed and the engine load. With this proposal, one shifting line can be used throughout the gear stages. Further, the proposal is also considered advantageous in that the torque converter turbine speed is relatively stable even under a wide change in the engine throttle valve opening so that hysteresis between shifting-up and shifting down lines can be made small. Further, it is not necessary to provide any restricting line, such as a stall line, so that there is provided versatility of determining the shifting lines.

OBJECTS OF THE INVENTION

The present invention has as an object to provide control means for an automatic transmission in which control is performed under the torque converter turbine speed and the engine load in such a manner that the vehicle can be operated at a gear stage at which the vehicle driveability can be significantly improved.

Another object of the present invention is to provide control means for an automatic transmission which is effective to improve response characteristics of the vehicle.

SUMMARY OF THE INVENTION

According to the present invention, the above and other objects can be accomplished by a vehicle automatic transmission including a hydraulic torque converter having an input member connected with an engine output shaft and an output member connected with a multiple stage transmission gear mechanism which has a plurality of gear stages, gear stage selecting means including hydraulic actuator means for selecting a desired one of said gear stages, a hydraulic circuit including solenoid valve means for controlling the supply of hydraulic pressure to said actuator means, speed detecting means for detecting a rotating speed of said output member of said torque converter and producing a speed signal, load detecting means for detecting engine load and producing a load signal, shift control means including shift control map means having a shift down control line which is determined by a line passing through points of maximum curvature on iso-engine-output-power lines, based on the rotating speed of said output member of the torque converter and the engine load, and at least one shift up control line which is shifted to a high speed side with respect to the shift down control line by an amount corresponding at least to a difference in gear ratio between two adjacent gear stages, said shift control means further including means for comparing the speed signal and the load signal with said shift control map to produce a shift control signal for energizing the solenoid valve means to perform a required gear shifting operation.

In an internal combustion engine, it has been known that the output torque is generally increased at a given engine speed as the throttle valve opening increases, however, there will be no further increase in the output torque even when the throttle valve is opened further beyond a certain extent. It should therefore be noted that the engine shows a poor response if it is operated in the range of such wide throttle valve opening. According to the present invention, the shift down control line is therefore determined by the line passing through the points of maximum curvature on iso-engine-output-power lines based on the speed of the torque converter output member and the engine load. With this arrangement, it becomes possible to avoid engine operation in a range of the aforementioned wide throttle valve opening.

According to another aspect of the present invention, the shift control map may include a plurality of shift up control lines which are provided for respective pairs of adjacent gear stages. The shift control means may then include means for choosing one of said shift up control lines, based on the gear stage which is in use, so that the speed signal and the load signal are compared with the chosen shift up control line.

DESCRIPTION OF THE PREFERRED EMBODIMENTS

Mechanism of the Transmission

Figure 4:
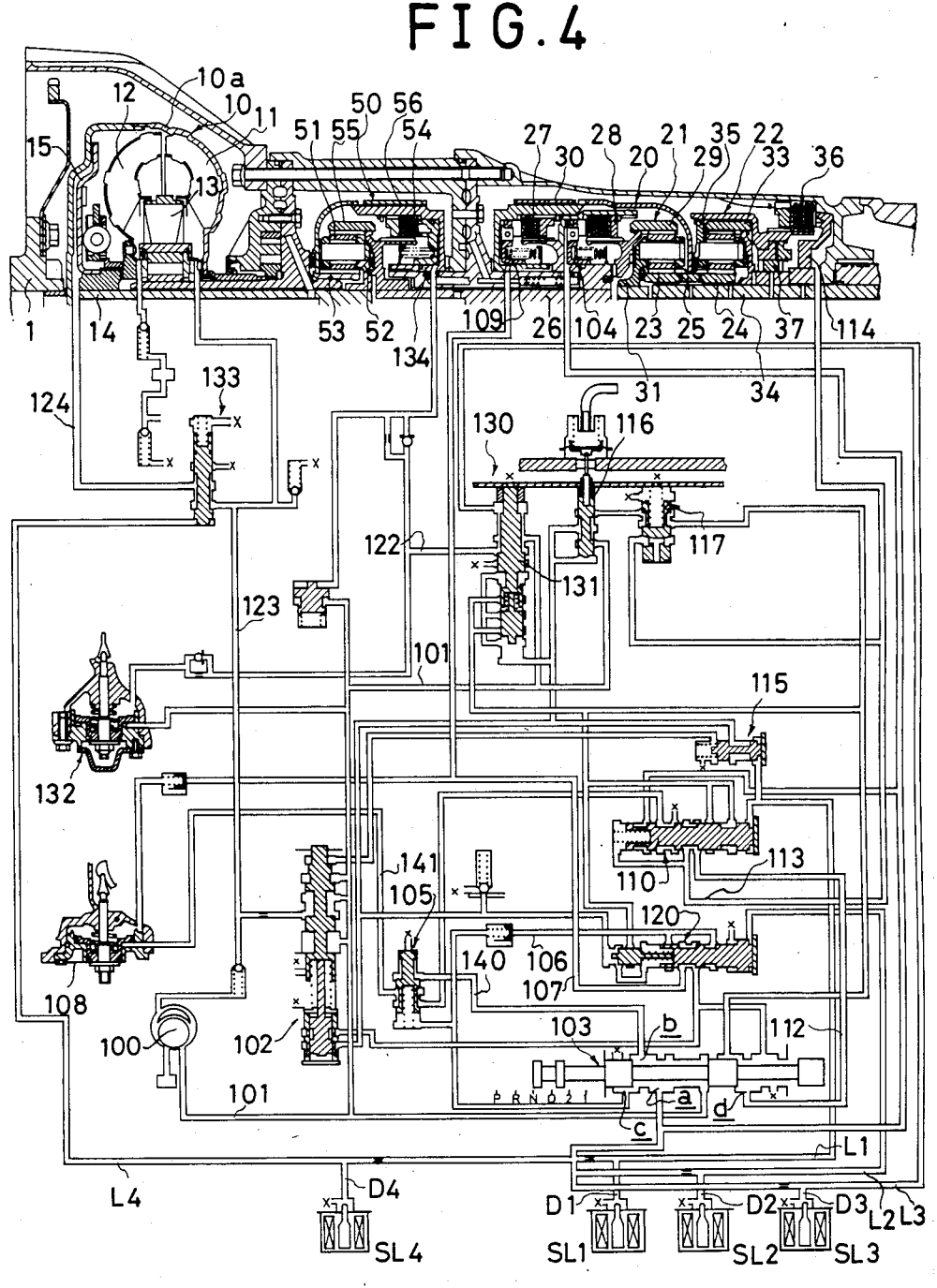
FIG. 4 is a view specifically showing the transmission mechanism and the hydraulic control circuit.

Referring to the drawings, particularly to FIG. 4, there is shown an automatic transmission which comprises a hydraulic torque converter 10, a multiple stage transmission gear mechanism 20, and a planetary gear type overdrive transmission mechanism 50 arranged between the torque converter 10 and the multiple stage transmission gear mechanism 20.

The torque converter 10 has a pump 11 connected with an engine output shaft 1 through a converter casing 10a, a turbine 12 facing the pump 11, and a stator 13 disposed between the pump 11 and the turbine 12. A converter output shaft 14 is connected with the turbine 12. A lock-up clutch 15 is provided between the converter output shaft 14 and the casing 10a which is connected to the pump 11. The lock-up clutch 15 is normally engaged with the casing 10a under the pressure of hydraulic fluid which circulates in the torque converter 10, and is released by a hydraulic pressure, which is drawn to a space between the casing 10a and the clutch 15 from an external pressure source.

The multiple stage transmission gear mechanism 20 has a front planetary gear unit 21 and a rear planetary gear unit 22. The front planetary gear unit 21 has a sun gear 23 connected with a sun gear 24 of the rear planetary gear unit 22 through a connecting rod 25. The gear mechanism 20 has an input shaft 26 connected through a front clutch 27 with the connecting rod 25 and through a rear clutch 28 with an internal gear 29 of the front planetary gear unit 21. A front brake 30 is provided between the connecting rod 25 or the sun gears 23, 24 and a casing of the transmission. The gear mechanism 20 also has an output shaft 34 connected with a planetary carrier 31 of the front planetary gear unit 21 and an internal gear 33 of the rear planetary gear unit 22. The rear planetary gear unit 22 has a planetary carrier 35, and there are provided between the planetary carrier 35 and the transmission casing a rear brake 36 and a one-way clutch 37.

The planetary gear type over-drive transmission mechanism 50 includes planetary gears 51, a planetary carrier 52 rotatably carrying the planetary gears 51 and connected with the output shaft 14 of the torque converter 10, a sun gear 53 engaged with the planetary gears 51, and internal gear 55 which is also engaged with the planetary gears 51 and connected with the sun gear 53 through a direct connecting clutch 54. An overdrive brake 56 is provided between the sun gear 53 and the transmission casing. The internal gear 55 is connected with the input shaft 26 of the multiple stage transmission gear mechanism 20.

The multiple stage transmission gear mechanism 20 is of a known type and can provide three forward driving gear stages and one reverse stage. The planetary gear type overdrive transmission mechanism 50 connects the shafts 14 and 26 directly when the direct connection clutch 54 is engaged and the brake 56 is released, and provides an over-drive connection between the shafts 14 and 26 when the brake 56 is engaged and the clutch 54 is released.

Hydraulic Control Circuit

The above-mentioned automatic transmission is provided with a hydraulic control circuit as shown in FIG. 4. The hydraulic control circuit has an oil pump 100 which is driven by the engine output shaft 1. Hydraulic oil is discharged under pressure from the pump 100 into a pressure line 101. The oil pressure is reduced by a pressure regulating valve 102 and applied to a select valve 103. The select valve 103 has a plunger which can be selectively positioned in one of the shift positions 1, 2, D, N, R and P. When the plunger is positioned in one of the shift positions 1, 2 and D, the pressure line 101 is communicated with ports a, b, c of the select valve 103. The port a is communicated with a hydraulic actuator 104 for the rear clutch 28. When the select valve 103 is positioned in the above mentioned position, the actuator 104 makes the rear clutch 28 engage. The port a is also communicated with the left-hand end portion of a 1-2 shift valve 110 having a spool which is now biased rightward in FIG. 4 under the oil pressure from the port a. The port a is further communicated with the right-hand end portion of the 1-2 shift valve 110 through a first line L1, the right-hand end portion of a 2-3 shift valve 120 through a second line L2, and the upper end portion of a 3-4 shift valve 130 through a third line L3. First, second, and third drain lines D1, D2 and D3 are provided in the first, second and third lines L1, L2 and L3, respectively. These drain lines D1, D2 and D3 are respectively provided with a first, second and third solenoid valves SL1, SL2 and SL3 for opening and closing them. When the port a is communicated with the line 101, the solenoid valves SL1, SL2 and SL3 are energized to close the drain lines D1, D2, D3, and as a result, the pressure is built up in the first, second and third line L1, L2, L3.

The port b is communicated with a second lock valve 105 through a line 140. The oil pressure which is applied from the port b to the second lock valve 105 acts to bias the spool of the valve 105 downwards. When the spool of the valve 105 is in the lower position, the line 140 is communicated with the line 141 so that the oil pressure is introduced into a brake engaging pressure chamber of the actuator 108 to engage the front brake 30. The port c is communicated with the second lock valve 105. The oil pressure which is applied from the port c to the second lock valve 105 acts to bias the spool of the valve 105 upward. The port c is also communicated with the 2-3 shift valve 120 through a pressure line 106. The line 106 is communicated with a line 107 when the spool of the 2-3 shift valve 120 is moved leftward by the pressure in the second line L2 which increases upon energizing the solenoid valve SL2 in the drain line D2. The line 107 is communicated with the releasing pressure chamber of the actuator 108. When oil pressure is introduced into such releasing pressure chamber, the actuator 108 is moved to release the brake 30 against the pressure in the engaging pressure chamber. Besides, the pressure in the line 107 is introduced into the actuator 109 for the front clutch 27 to make the clutch 27 engage.

The select valve 103 has a port d which is communicated with the pressure line 101 when the valve 103 is positioned in the position 1. The port d is communicated with the 1-2 shift valve 110 through a line 112, and with an actuator 114 for the rear brake 36 further through a line 113. When the solenoid valves SL1 and SL2 are energized, the spools of the 1-2 shift valve 110 and the 2-3 shift valve 120 are moved to thereby change the port connections for engaging appropriate brakes and/or clutches to establish 1-2, 2-3 shifting operations respectively. The hydraulic control circuit is also provided with a cut-back valve 115 for making the oil pressure from the pressure regulating valve 102 stable, a vacuum throttle valve 116 for varying the line pressure from the pressure regulating valve 102 according to the suction pressure in the engine intake passage, and a valve 117 for backing up the throttle valve 116.

Furthermore, this hydraulic control circuit is provided with a 3-4 shift valve 130 and an actuator 132 for controlling the clutch 54 and the brake 56 of the planetary gear type over-drive transmission mechanism 50. The actuator 132 has an engaging pressure chamber communicated with the pressure line 101. The brake 56 is operated when the actuator 132 is moved under the pressure in the line 101. When the solenoid valve SL3 is energized, the spool of the 3-4 shift valve 130 is moved downward to communicate the pressure line 101 with a line 122 so that the oil pressure is introduced into the line 122. The oil pressure introduced into the line 122 acts on a releasing pressure chamber of the actuators 132 to release the brake 56, and on an actuator 134 to make the clutch 54 engage.

Still further, the present hydraulic control circuit is provided with a lock-up control valve 133, which is communicated with a port a of the select valve 103 through a line L4. From the line L4, a drain line D4 branches off and is provided with a solenoid valve SL4. When the pressure in the line L4 increases by closing the drain line D4 with the solenoid valve SL4 being energized, the lock-up control valve 133 has its spool moved to cut the communication between the lines 123 and 124 and drain the pressure in the line 124 so that the lock-up clutch 15 is engaged.

In the above arrangement, the relations of the respective transmission stages and the lock-up with respect to the operations of the solenoids, the clutches and the brakes are shown in the Tables 1 through 3.

TABLE 1

| Shift position | Solenoid valve | | |
|---|---|---|---|
| | 1 | 2 | 3 |
| 1 | OFF | OFF | OFF |
| 2 | ON | OFF | OFF |
| 3 | ON | ON | OFF |
| 4 | ON | ON | ON |

TABLE 2

| SOL 4 | Lock-up |
|---|---|
| ON | engage |
| OFF | release |

TABLE 3

| | | clutch 28 | clutch 27 | clutch 15 | clutch 54 | brake 36 | brake 30 | brake 56 | one-way clutch 37 | gear ratio |
|---|---|---|---|---|---|---|---|---|---|---|
| | P | | | | | | o | | | |
| | R | | o | | | | o | o | | 2.181 |
| | N | | | | | | o | | | |
| D | first | o | | | | | o | | o | 2.458 |
| | second | o | | (o) | | o | | o | | 1.458 |
| | third | o | o | (o) | o | | | | | 1.000 |
| | OD | o | o | (o) | | | | o | | 0.685 |
| | 2 | o | | | | o | | o | | 1.458 |
| 1 | first | o | | | | o | o | | | 2.458 |
| | second | o | | | | o | | o | | 1.458 |

Electronic Control Circuit

Figure 3:
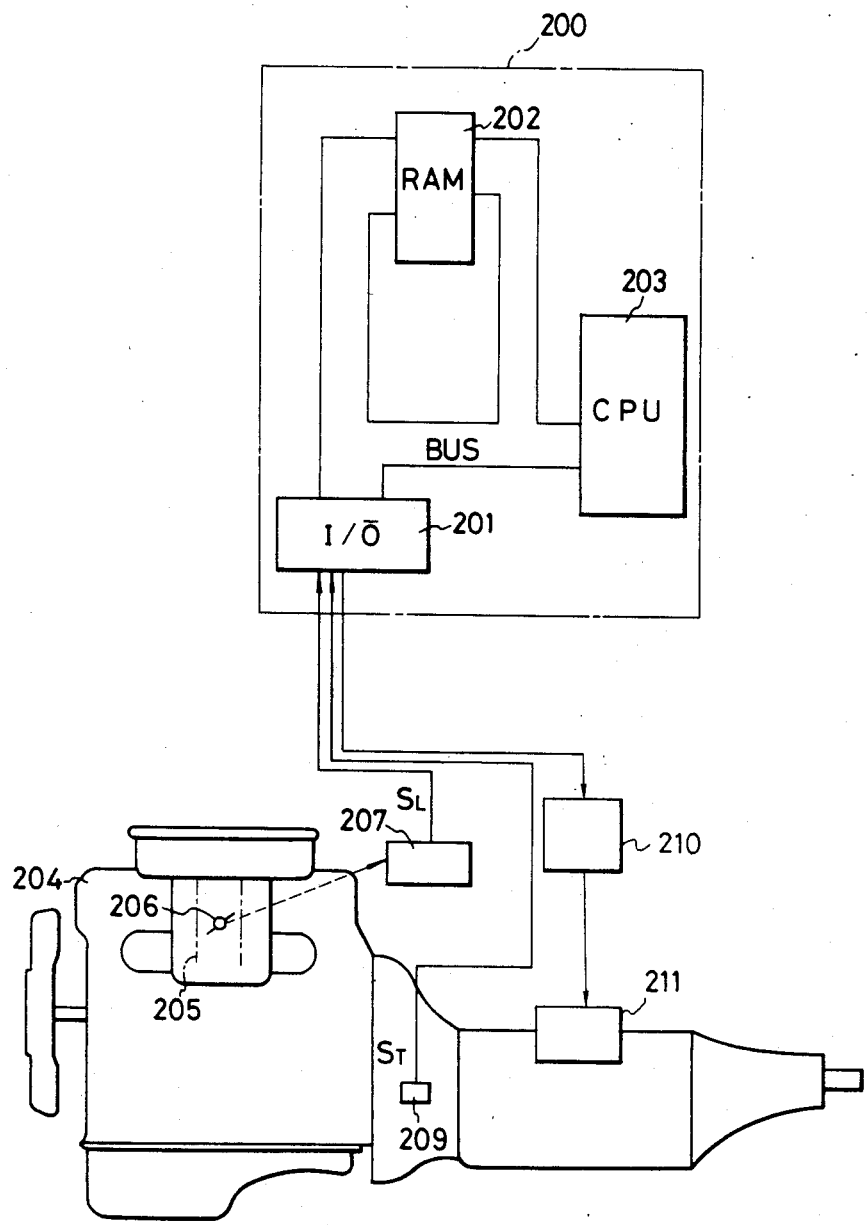
FIG. 3 is a diagrammatical illustration of an automatic transmission in accordance with one embodiment of the present invention.

Referring to FIG. 3, there is shown an electronic control circuit 200 for controlling the above hydraulic control circuit. The electronic control circuit 200 can be constituted by a microcomputer which is provided with an input-output equipment (I/O) 201, a random access memory (RAM) 202 and a central processing unit (CPU) 203. For supplying signals to the I/O, there are provided an engine load sensor 207, and a torque converter turbine speed sensor 209. The engine load sensor 207 detects the load on an engine 204 in terms of the opening of an engine throttle valve 206 provided in the intake passage 205 of the engine 204 to produce an engine load signal SL. The turbine speed sensor 209 senses the rotating speed of the converter output shaft 14 to produce a turbine speed signal ST.

The I/O receives the engine load signal SL and the turbine speed signal ST, processes these signals, and applies them to the RAM 202. The RAM memorizes the signals SL and ST and applies these signals SL, ST, and other data pre-stored in the RAM to the CPU in accordance with demands of the CPU. As examples of the prestored data, there is a gear shift control map including gear shift up control lines Lu1 and Lu2, gear shift down control lines Ld and Ld1, a torque converter lock up line Le and a torque converter lock up release line Le' as shown in FIGS. 5A and 5B.

Figure 1:
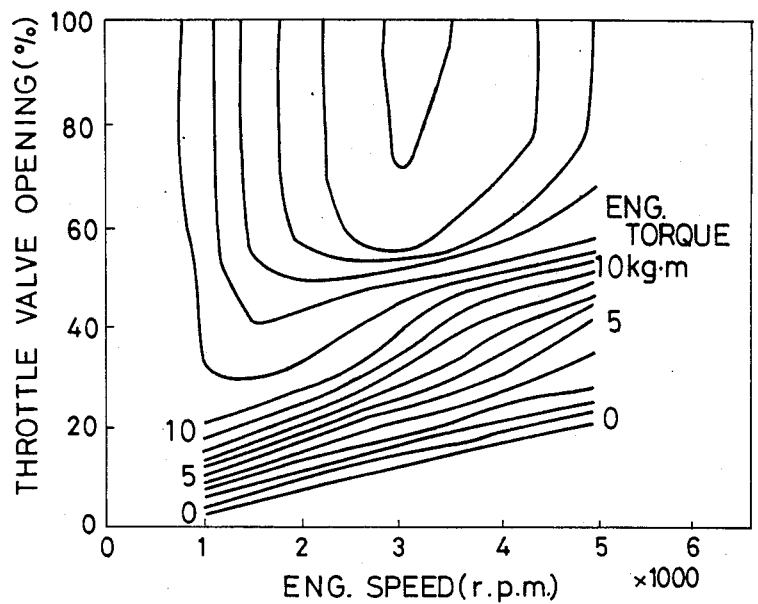
FIG. 1 is a diagram showing iso-torque lines of an internal combustion engine based on the engine speed and the throttle valve opening.
Figure 2:
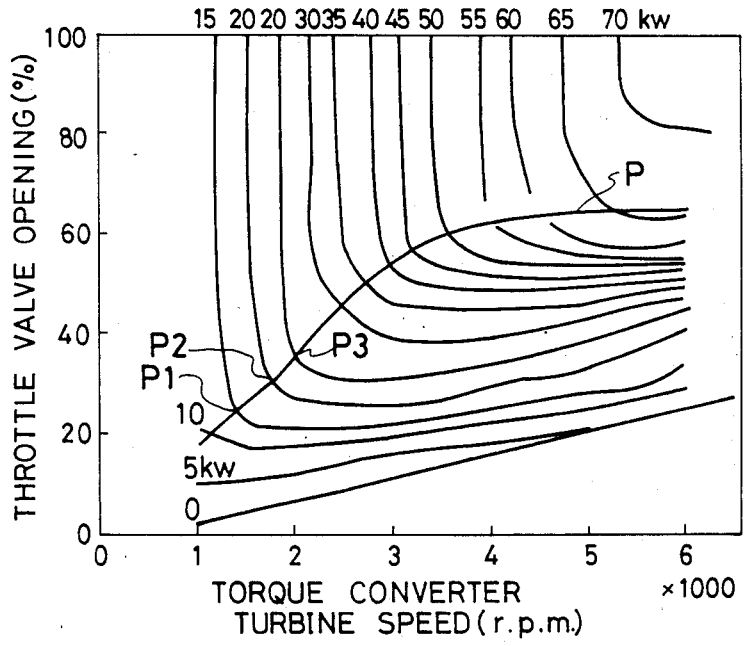
FIG. 2 is a diagram showing iso-engine-output-power lines as functions of the engine throttle valve position and the torque converter output speed.

The gear shift down control line Ld is drawn in accordance with the characteristics of the engine output power. As shown in FIG. 1, an internal combustion engine has an operating range in which the engine output torque does not increase under a given speed even when the throttle valve opening is increased beyond a certain point. Therefore, iso-output-power curves drawn as functions of the torque converter turbine speed and the engine throttle valve opening have points of maximum curvature P1, P2, P3 ... as shown in FIG. 2. It is therefore possible to draw a line P which passes through the points of maximum curvature. In the region above the line P, the engine will show poor response.

Figure 5A:
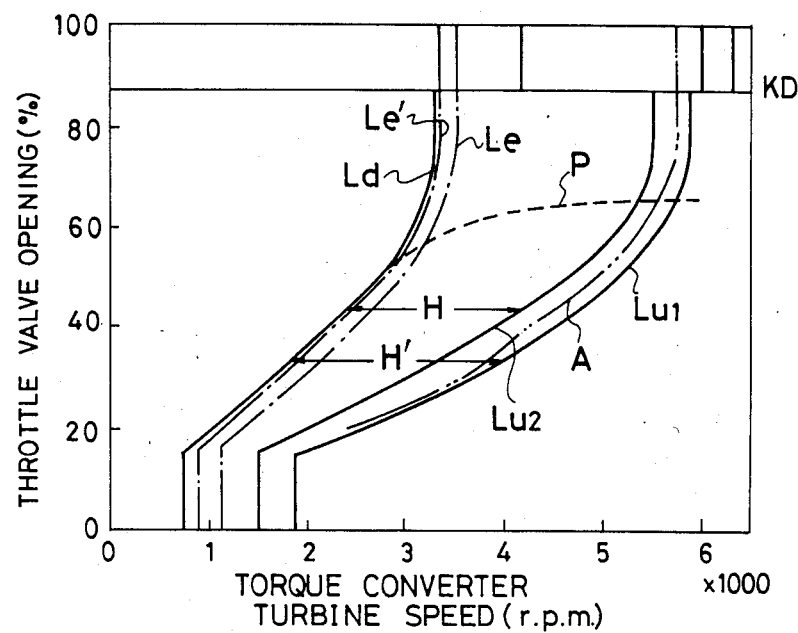
FIG. 5A is a diagram showing a shift control map including shift up control lines and lock up control lines.
Figure 5B:
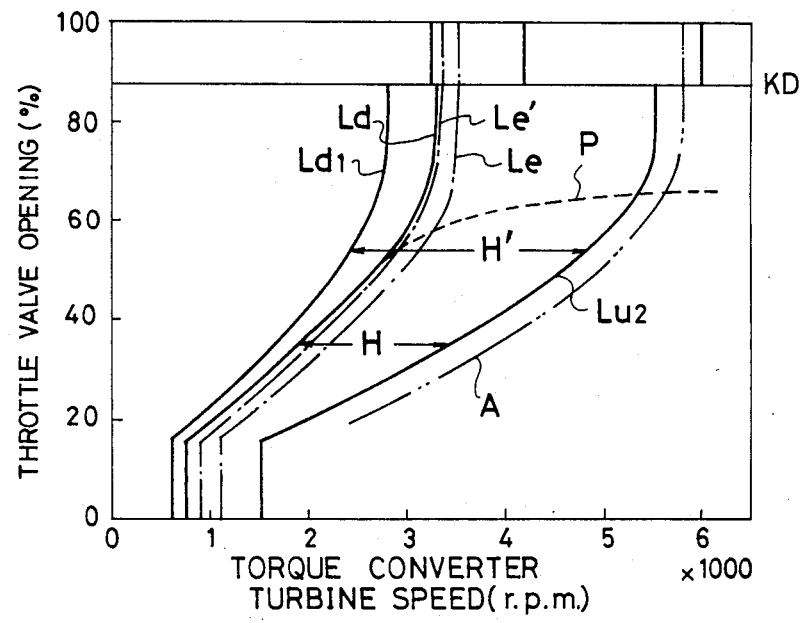
FIG. 5B is a diagram showing a shift control map including shift down control lines and lock up control lines.

The shift down control line Ld in FIG. 5A is drawn based on this line P in FIG. 2, except in the high load range when the engine throttle valve opening is greater than 60% of the maximum opening and in an extreme light load zone when the throttle valve opening is less than 10% of the maximum opening as shown in FIG. 5A.

The shift map shown in FIG. 5A includes a 1-2 shift up control line Lu1, and a 2-3 and 3-4 shift up control line Lu2 in addition to the shift down control line Ld. The shift up control lines Lu1 and Lu2 are determined on the basis of the shift down control line Ld, taking into consideration the difference in gear ratio of the gear stages concerned. More specifically, there will be a change in the output speed of the torque converter when the transmission gear stage is shifted from one gear stage up to a next higher gear stage and, in order to avoid hunting the shift up control line must be shifted from the shift down control line toward the high speed side at least by an amount H or H' corresponding to such change in the converter output speed. With the shift up control lines thus determined, it becomes possible to prevent the gear mechanism from being shifted down back to a lower stage immediately after a shifting up operation, or vice versa. In the shift control map shown in FIG. 5B, the shift-up control line Lu1 is omitted and instead a 2-1 shift down control line Ld1 is additionally provided. The 2-1 shift down control line Ld1 is shifted from the shift up control line Lu2 by a distance H corresponding to the difference in gear ratio of the first and second gear stages.

In accordance with a certain program which can be adopted in the present invention, the CPU 203 reads one of the shift lines and the lock-up control lines shown in FIGS. 5A and 5B according to the engine load signal SL, and determines whether or not a shift operation shall be carried out on the basis of a comparison of the turbine speed signal ST with the shift line concerned, or whether or not the lock-up shall be engaged on the basis of comparison of the turbine speed signal ST with the lock-up control map. The CPU 203 thus produces a shift signal or a lock-up signal and applies it through the I/O and a driving circuit 210 to a group of solenoid valves 211 for operating the 1-2 shift valve 110, and the 2-3 shift valve 120, the 3-4 shift valve 130 and the lock-up control valve 133. The group of solenoid valves 211 includes the solenoid valves SL1, SL2, SL3 and SL4 for the 1-2, 2-3 and 3-4 shift valves 110. 120 and 130 and the lock-up control valve 133.

General Operation

Figure 9:
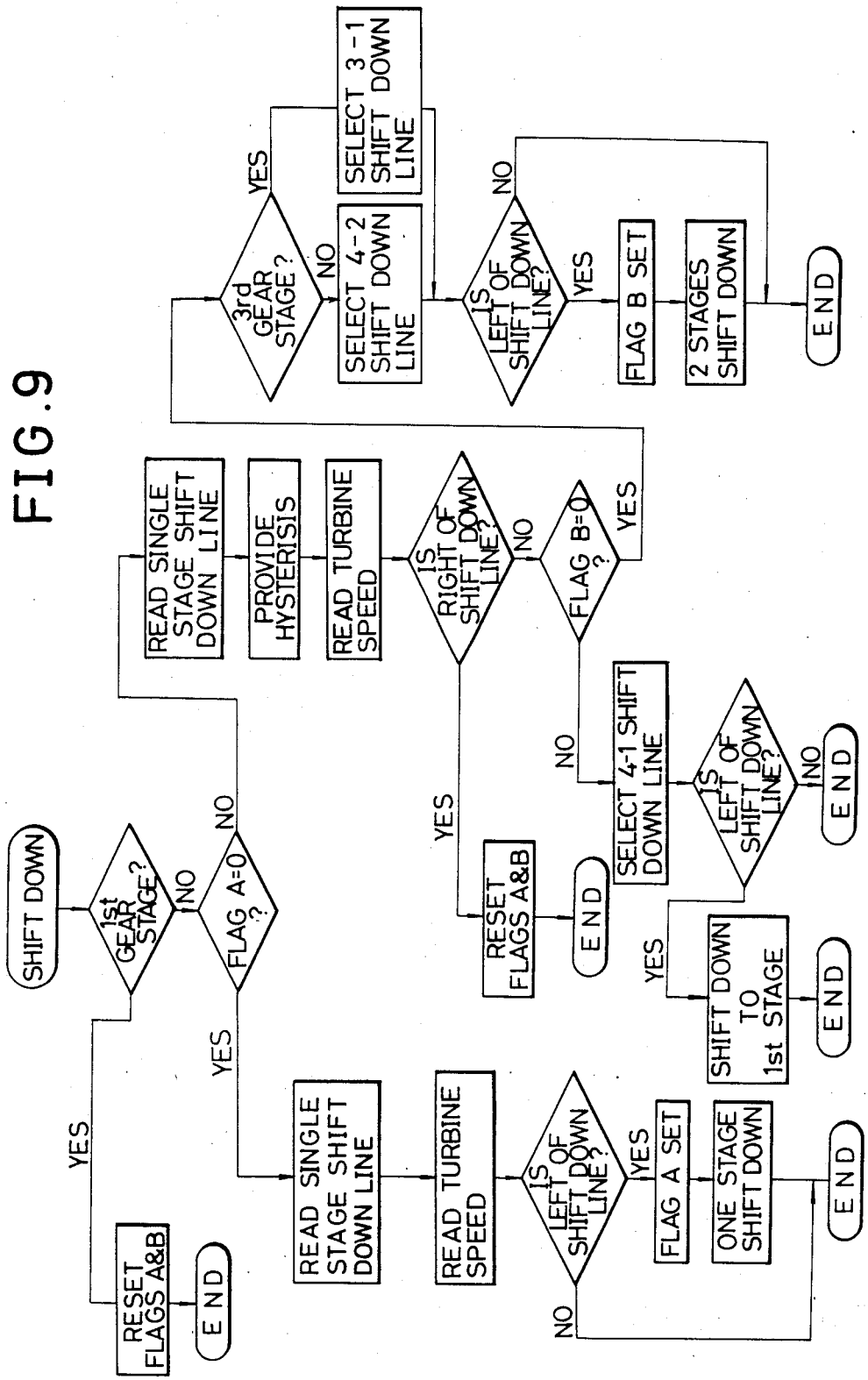
FIG. 9 is a flow chart showing the gear shift down control.

The gear shift and lock-up control operations by the aforementioned electronic control circuit 200 will now be described. Preferably, the control circuit 200 is made of a microprocessor which is programmed to carry out the operation in accordance with flow charts, for example as shown in FIGS. 6, 7 and 9.

Figure 6:
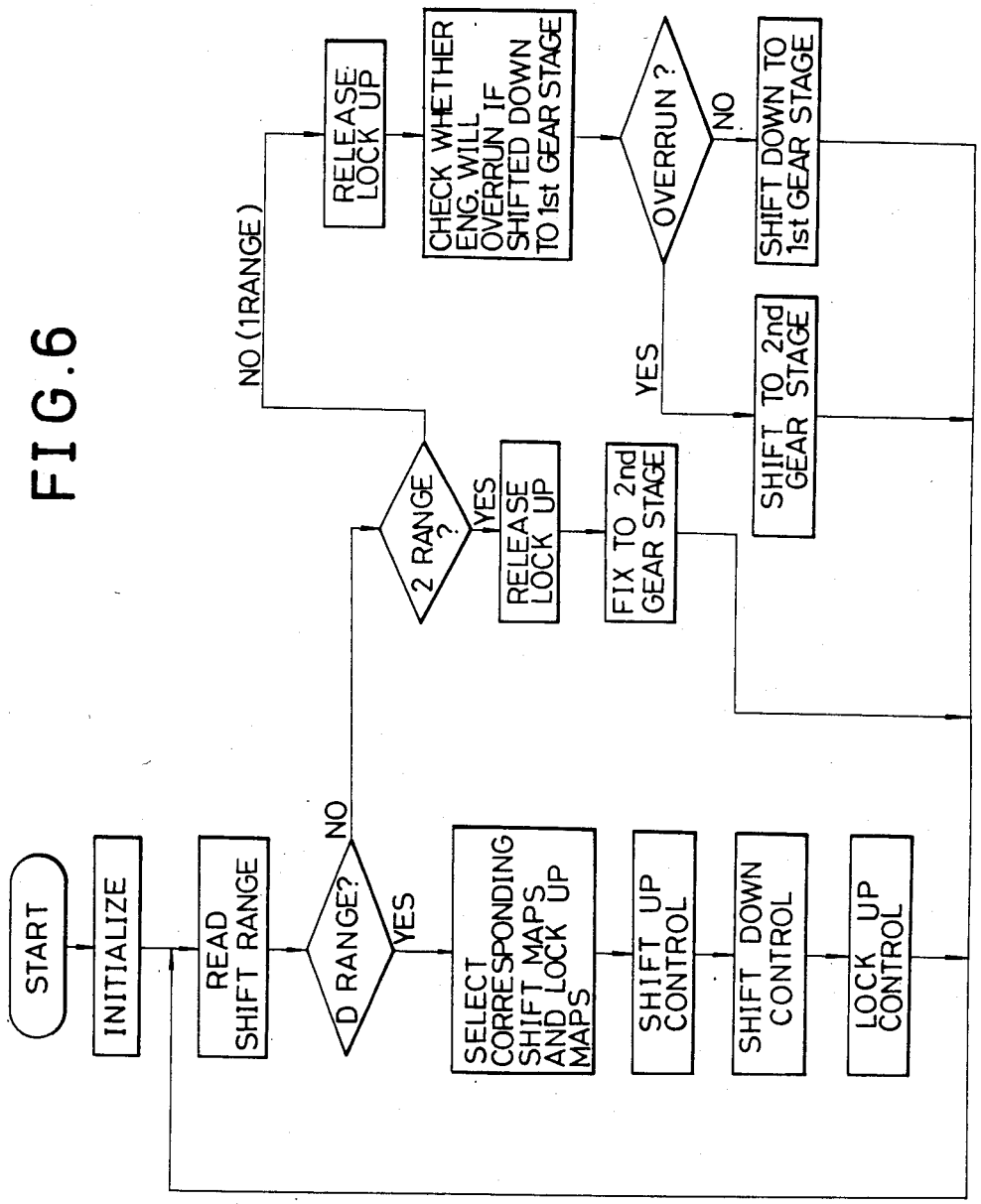
FIG. 6 is a program flow chart showing a general operation of the control unit.
Figures 7, 7A:
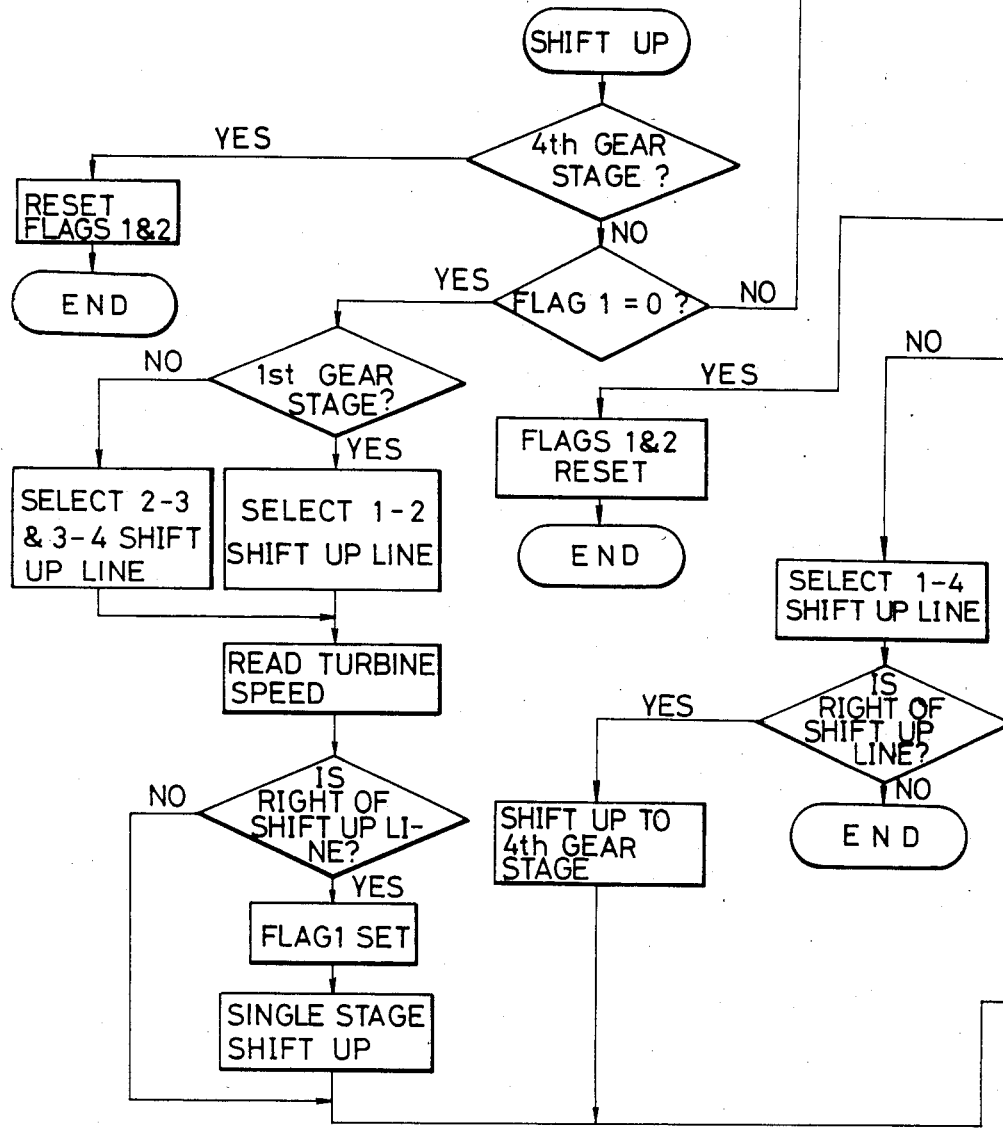
FIG. 7A and 7B are a flow chart showing the gear shift up control.
Figure 7B:
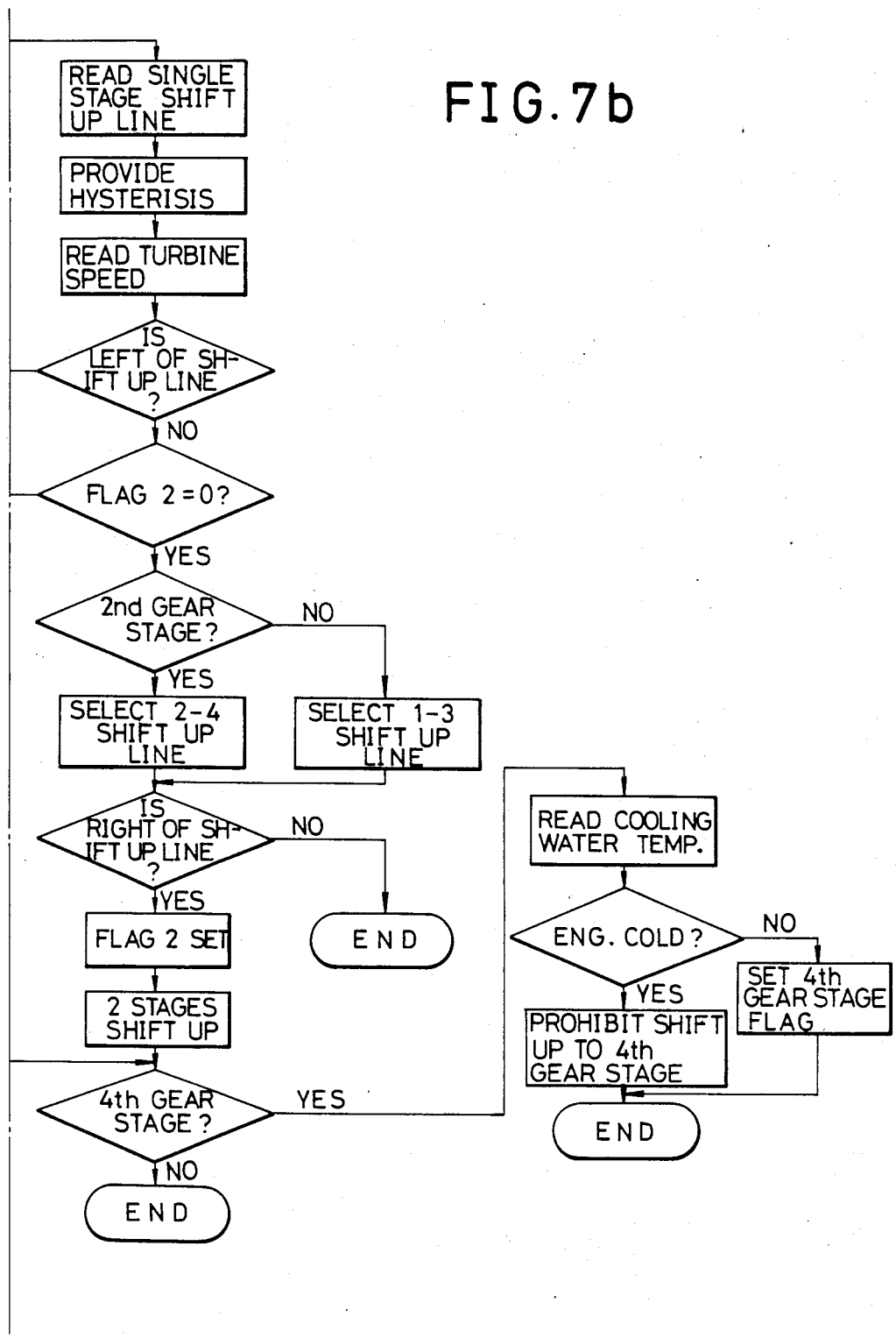

FIG. 6 shows in general the operation of the control circuit. When the program is initialized, the ports in the respective hydraulic control valves and the counters in the circuit are brought into initialized positions to thereby hold the gear mechanism at the first stage and release the torque converter lock-up clutch 15. Thereafter, the shift range or the position of the select valve 103 is read and a judgement is carried out as to whether the shift range is at the "D" range. If the judgement is NO, a further judgement is carried out as to whether the shift range is at "2" range. If the judgement is YES, signals are applied to the shift valves to release the lock-up and to fix the gear mechanism 20 at the second stage. If the judgement is to indicate that the shift range is not at the second stage, it is interpreted that the shift range is "1" range. Therefore, a signal is produced to release the lock-up clutch and thereafter an operation is made to determine whether the engine will over-run when the gear mechanism is shifted down to the first stage. When the result of the operation indicates that there will be no engine overrun, the gear mechanism is shifted down to the first stage. When it is judged that there will be an engine overrun, the gear mechanism is shifted to the second stage.

When the first-mentioned judgement is to indicate that the shift range is "D" range, appropriate control maps are selected and control on the gear shift-up, gear shift-down and lock-up are carried out in accordance with the selected maps.

Shift-up Control

Referring to FIG. 7, the gear position of the transmission gear mechanism 20 is at first read and a judgement is made as to whether the gear mechanism 20 is at the fourth stage. If the judgement is YES, flags 1 and 2 are reset and the shift-up control is terminated because no further shift-up is possible. The flags 1 and 2 are provided for being set when a single stage shift-up and a skip shift-up are respectively carried out to memorize such shift-up.

Figure 8:
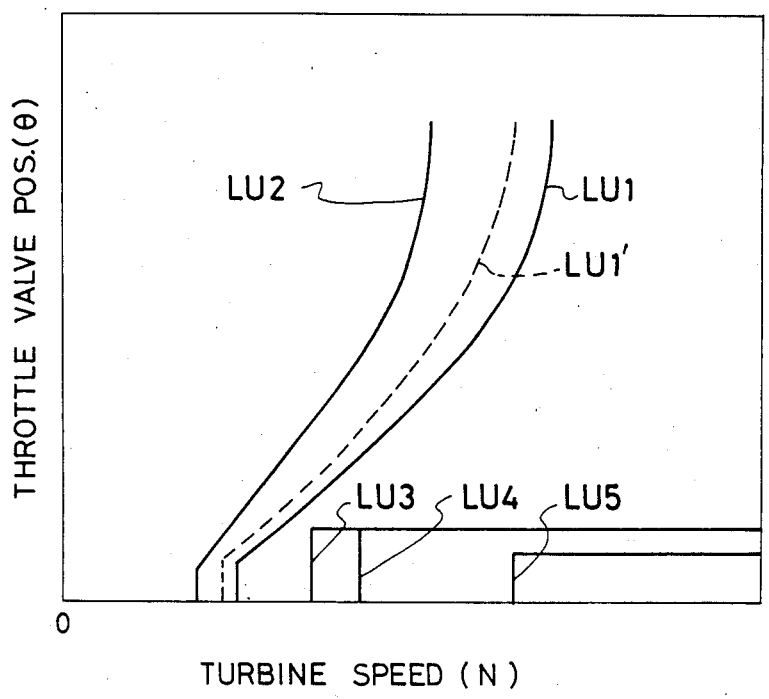
FIG. 8 is a diagram showing shift up control lines.

If the fourth gear stage judgement is NO, a judgement is made as to whether the flag 1 is reset to "0" position. When the judgement is YES, a further judgement is made as to whether the transmission gear mechanism 20 is at the first stage. If the judgement is YES, the 1-2 shift up control line is selected. The 1-2 shift up control line may be the line as shown by Lu1 in FIG. 8. If the judgement is NO, the 2-3 and 3-4 shift up control line Lu2 is selected. Then, the torque converter turbine speed $T_{SP}$ is read and compared with the shift-up line Lu1 or Lu2 to check whether the turbine speed is larger than the speed as determined by the shift-up line. If the turbine speed is not larger than the speed as determined by the shift-up line Lu1 or Lu2 the control is terminated, but if the former is larger than the latter, the flag 1 is set and a command signal is produced to shift up the gear mechanism by one stage.

Where the flag 1 is not in the reset position "0", the single stage shift up line Lu1 is read and multiplied by a figure between 0.8 and 0.95 to define a new shift-up line Lu1' having a hysteresis with respect to the line Lu1. Then, the actual turbine speed $T_{SP}$ is read and compared with the speed as determined by the line Lu1' to judge whether the speed $T_{SP}$ is smaller than the speed as determined by line Lu1' under the given throttle valve opening. If the judgement is YES, the flags 1 and 2 are reset and the control is finished. If the judgement is NO, a further judgement is made as to whether the flag 2 is reset to "0". If the answer is YES, a judgement is further made as to whether the gear mechanism is at the second stage. If the judgement is YES, the 2-4 skip shift-up control line Lu3 is selected for controlling the skip shift-up from the second gear stage to the fourth gear stage, but if the judgement is NO, the 1-3 skip shift up control line Lu4 is selected for controlling the skip shift-up from the first gear stage to the third gear stage.

Thereafter, the turbine speed $T_{SP}$ is compared with the control line Lu3 or Lu4 to judge whether the speed $T_{SP}$ is larger than the speed as determined by the control line under the given throttle valve opening. The judgement NO makes the control end, but the judgement YES causes the flag 2 to be set to thereby produce a command signal for carrying out the two-stage skip shift up.

If the judgement as to whether the flag 2 is reset to "0" is NO, the 1-4 skip shift-up control line Lu5 is selected for a three-stage skip shift up from the first gear stage to the fourth gear stage. Then, the turbine speed $T_{SP}$ is compared with the speed as determined by the line Lu5 under the given throttle valve opening and, if the former is not larger than the latter, the control is finished. If the former speed is larger than the latter speed, a command signal is produced to shift up the gear mechanism to the fourth gear stage.

Whenever the aforementioned command signals are produced, judgement is made as to whether the signals contain a command for shifting up to the fourth stage and, if the judgement is NO, the control is finished. If the judgement is YES, a further judgement is made as to whether the engine operating condition is suitable for the shifting up to the fourth gear stage. This judgement is carried out at first by reading the engine cooling water temperature. If it is found that the engine cooling water temperature is lower than a predetermined value, a prohibition signal is produced to prohibit the shifting up to the fourth gear stage. If it is judged that the engine is warmed up, the fourth gear stage flag is set to show that the gear mechanism is being shifted up to the fourth stage and finish the control.

It should be noted that in the aforementioned gear shift up control, the torque converter lock up clutch is disengaged each time before the gear shift up command signal is produced in each gear stage.

Shift Down Control

As shown in FIG. 9, in the gear shift down control, the gear position of the transmission gear mechanism 20 is at first read and judged whether the gear mechanism is at the first stage. If the judgement is YES, no further control can be carried out so that the flags A and B are reset to "0" and finish the control. The flags A and B are provided for being set to "1" when the single stage shift down and the skip shift down are respectively carried out.

Figure 10:
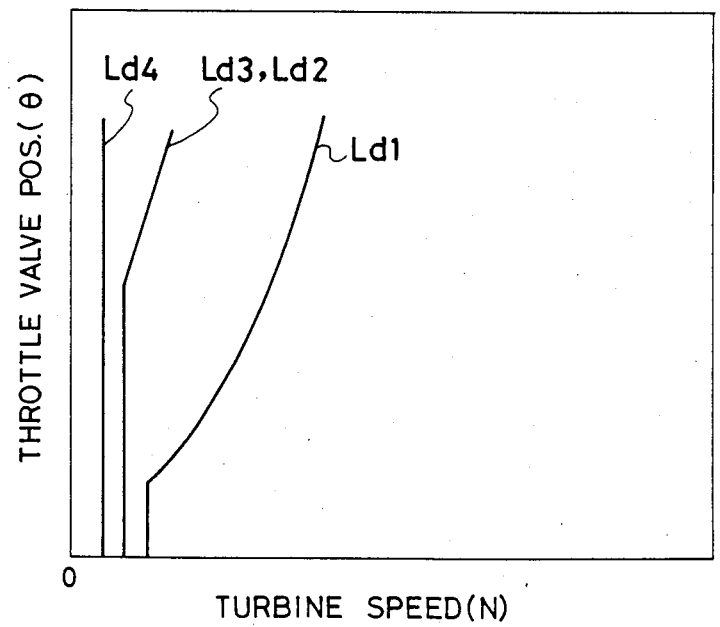
FIG. 10 is a diagram showing shift down control lines.

If the aforementioned judgement is NO, a further judgement is made as to whether the flag A is reset to "0" and if the judgement is YES, the single stage shift down control line Ld1 is selected as shown in FIG. 10 for controlling the single stage shift down. The line Ld1 is determined based on the control line Ld in FIG. 5A. Then the turbine speed $T_{SP}$ is compared with the speed as determined by the line Ld1 to judge whether the actual turbine speed is smaller than the speed as determined by the control line under the given throttle valve opening. When the former is not smaller than the latter, the control is finished, but if the former is smaller than the latter, the flag A is set and a command signal is produced for a single stage shift down.

If the flag A is not reset to "0", the single stage shift down control line Ld1 is multiplied by a figure between 1.05 and 1.2 to define a new control line which has a hysteresis with respect to the control line Ld1. Then, the turbine speed $T_{SP}$ is compared with the speed as determined by the new control line under the given throttle valve opening. If the former speed is larger than the latter, the flags A and B are reset to "0" and finish the control. If the former is not larger than the latter, a further judgement is made as to whether the flag B is reset to "0". If this judgement is YES, a still further judgement is made as to whether the gear mechanism is at the third stage. If it is not at the third gear stage, the 4-2 skip shift down control line Ld2 is selected but, if the gear mechanism is at the third gear stage, the 3-1 skip shift down control line Ld3 is selected.

Then, the turbine speed $T_{SP}$ is compared with the speed as determined by either of the lines Ld3 and Ld4 under the given throttle valve opening to check whether the former is smaller than the latter. If the former is not smaller than the latter, the control is finished but, if the former is smaller than the latter, the flag B is set and a two stage shift down signal is produced.

When the flag B is not reset to "0", the 4-1 skip shift down control line Ld4 is selected for carrying out the three stage skip shift down from the fourth gear stage to the first gear stage. Then, the turbine speed $T_{SP}$ is compared with the speed as determined by the line Ld4 under the given throttle valve opening to check whether the former is smaller than the latter. If the former is not smaller than the latter, the control is finished but, if the former is smaller than the latter, a skip shift down signal is produced for shifting down from the fourth gear to the first gear stage.

Lock Up Control

The lock up control is carried out by comparing the turbine speed $T_{SP}$ with either of the lock up engage and release lines Le and Le' to judge whether the actual turbine speed is larger than the speed as determined by the control line under a given throttle valve position. In the lock up control, the engine cooling water temperature is read and if the engine temperature is found to be low, a lock up release signal is produced.

The invention has thus been shown and described with reference to a specific embodiment. However, it should be noted that the invention is in no way limited to the details of the illustrated arrangements but changes and modifications may be made without departing from the scope of the appended claims.

We claim:

1. A vehicle automatic transmission including a hydraulic torque converter having an input member connected with an engine output shaft and an output member connected with a multiple stage transmission gear mechanism which has a plurality of gear stages, gear stage selecting means including hydraulic actuator means for selecting a desired one of said gear stages, a hydraulic circuit including solenoid valve means for controlling a supply of hydraulic pressure to said actuator means, speed detecting means for detecting a rotating speed of said output member of said torque converter and producing a speed signal, engine throttle valve position detecting means for detecting engine throttle valve position and producing a throttle position signal, shift control means including shift control map means having a shift down control line which is determined by a line passing through points of maximum curvature on iso-engine-output power lines based on the rotating speed of said output member of the torque converter and the engine throttle valve position, and at least one shift up control line which is shifted to a high speed side in accordance with a difference in gear ratio between two adjacent gear stages with respect to the shift down control line by an amount corresponding to a change in speed of the torque converter output member when a single stage shift up operation is carried out from the gear stage which is actually in use, said shift control means further including means for comparing the speed signal and the throttle position signal with said shift control map to produce a shift control signal for energizing the solenoid valve means to perform a required gear shifting operation.

2. A vehicle automatic transmission in accordance with claim 1 in which said shift control map means includes a plurality of shift up control lines repectively for respective pairs of adjacnet gear stages, said shift control means including means for selecting one of the shift up control lines corresponding to the gear stage which is actually in use.

3. A vehicle automatic transmission in accordance with claim 1 in which said shift down control line is determined in accordance with the line passing through the points of maximum curvature on iso-engine-output-power lines, except in a high power zone wherein the engine throttle valve position is beyond a first predetermined opening and in an extremely light load zone wherein the throttle valve position is below a second predetermined opening which is smaller than the first predetermined opening.

4. A vehicle automatic transmission in accordance with claim 1 in which said transmission gear mechanism includes planetary gear mechanisms.

5. A vehicle automatic transmission in accordance with claim 1 in which the hydraulic circuit includes pilot pressure operated shift valves, said solenoid valve means being provided for controlling pilot pressures for the shift valves.

6. A vehicle automatic transmission in accordance with claim 1 in which said torque converter includes lock up clutch means which is controlled by said hydraulic circuit, and said shift control means controls engagement of said lock up clutch means.

7. A vehicle automatic transmission in accordance with claim 3 in which said first predetermined opening is a position corresponding to about 60% opening and said second predetermined opening is a position corresponding to about 10% opening.

* * * * *